United States Patent [19]

Matsui et al.

[11] Patent Number: 5,780,731
[45] Date of Patent: Jul. 14, 1998

[54] METHOD FOR JUDGING THE LOCKED STATE OF AUXILIARIES FOR AUTOMOBILES

[75] Inventors: Hirohito Matsui, Nishio; Yasushi Yamanaka, Nakashima-gun; Yoshiaki Takano, Obu; Hiroshi Kishita, Anjo, all of Japan

[73] Assignees: Denso Corporation, Kariya; Nippon Soken, Inc., Nishio, both of Japan

[21] Appl. No.: 834,483

[22] Filed: Apr. 11, 1997

[30] Foreign Application Priority Data

Apr. 11, 1996 [JP] Japan ................... 8-089639

[51] Int. Cl.$^6$ .................................. G01M 19/00
[52] U.S. Cl. ........................... 73/118.1; 701/101
[58] Field of Search .................. 73/862.453, 862.194, 73/118.1; 701/101

[56] References Cited

U.S. PATENT DOCUMENTS 5,197,326  3/1993  Palm .......................... 73/118.1
5,207,091  5/1993  Shibata et al. ............. 73/118.1
5,693,878  12/1997 Giles .......................... 73/118.1

*Primary Examiner*—Ronald L. Biegel
*Attorney, Agent, or Firm*—Cushman Darby & Cushman IP Group of Pillsbury Madison & Sutro LLP

[57] ABSTRACT

A system for detection of the load torque of auxiliaries of an automobile engine is utilized to detect a locked state of an air-conditioner refrigerant compressor, power-steering oil pump, etc. Namely, a first auxiliary torque in a state where the air-conditioner is operating is measured, and when this exceeds a predetermined value, a second auxiliary torque is measured in a state where the clutch of the compressor is disengaged. When the difference between them exceeds another predetermined value, it is judged that the compressor has locked. When the difference does not exceed the predetermined value, it is judged that the oil pump etc. has locked.

4 Claims, 8 Drawing Sheets

METHOD FOR JUDGING THE LOCKED STATE OF AUXILIARIES FOR AUTOMOBILES

BACKGROUND OF THE INVENTION

1. Field of the Invention

The present invention relates to a method for detecting a locked state of auxiliaries of automobile engines, in particular, refrigerant compressors for air-conditioners and oil pumps for power steering.

2. Description of the Related Art

In engines mounted in automobiles and other vehicles, the auxiliaries, for example, the air-conditioner refrigerant compressor, power-steering oil pump, alternator, radiator cooling fan, etc. are simultaneously driven by a crankshaft pulley attached to the crankshaft of the engine via a belt.

As one method conventionally used for detecting the locked state of an air-conditioner refrigerant compressor, there has been the method of measuring the rotational speed of the refrigerant compressor by a pick-up type rotation sensor, comparing this speed and the speed of the engine, and judging the locked state based on a difference between the two.

However, the pick-up type speed sensor is used for only the detection of the locked state of the air-conditioner refrigerant compressor, so when considering the overall system for detection of the auxiliary torque, it is necessary to add separate devices exclusively for other specific purposes such as the detection of the locked state of the refrigerant compressor. These make the system as a whole more complicated.

SUMMARY OF THE INVENTION

The present invention was made in consideration with the above problem and has as its object to provide a method for detecting the locked state of an air-conditioner refrigerant compressor and a power-steering oil pump by utilizing a system for detection of the load torque of the auxiliaries of an automobile engine, for example, the air-conditioner refrigerant compressor, power-steering oil pump, alternator, and radiator cooling fan.

The present invention provides a method for judging the locked state of the auxiliaries for automobiles as disclosed in the claims as a means for achieving the above object.

According to the means disclosed in claim 1, first, the auxiliary torque detection system is used to detect a first auxiliary torque when the air-conditioner is operating. If it is judged that the first auxiliary torque exceeds a first predetermined value, there is a suspicion that the air-conditioner refrigerant compressor has locked up so the clutch for driving the refrigerant compressor is disengaged. A second auxiliary torque is measured in that state and the first auxiliary torque and the second auxiliary torque are compared. When this comparison shows that the difference of these two auxiliary torques exceeds a second predetermined value, that is, when a reduction of the auxiliary torque of more than the second predetermined value is seen as a result of the disengagement of the clutch, it can be judged that the refrigerant compressor is in a locked state.

According to the means disclosed in claim 2, when the comparison mentioned above shows that the difference of the first auxiliary torque and the second auxiliary torque does not exceed the second predetermined value, the air-conditioner refrigerant compressor is not in a locked state, so it can be judged that another lockable auxiliary is in a locked state.

Contrary to this, in the means disclosed in claims 3 and 4, the quantity which is compared with the second auxiliary torque is not the first auxiliary torque, but the normal value of the first auxiliary torque which was previously recorded when all the auxiliaries were normally operating. If the second auxiliary torque actually measured in a state where the clutch driving the refrigerant compressor is disengaged is smaller than the normal value of the first auxiliary torque stored in a memory of the control unit etc., it is obvious that the refrigerant compressor engaged by the clutch is locked. If the second auxiliary torque is larger than the normal value of the first auxiliary torque, it is due to a factor completely unrelated to the clutch for the refrigerant compressor and it can be deduced that the power-steering oil pump is in a locked state.

By these means, a general system for detection of the auxiliary torque can be utilized as it is for the detection of the locked state of the lockable auxiliaries of an automobile, that is, the air-conditioner refrigerant compressor or the power-steering oil pump, and therefore it becomes possible to eliminate the conventionally used rotation sensor of value only for the detection of the locked state of the air-conditioner refrigerant compressor and to simplify the overall system.

DESCRIPTION OF THE PREFERRED EMBODIMENTS

Figure 1:
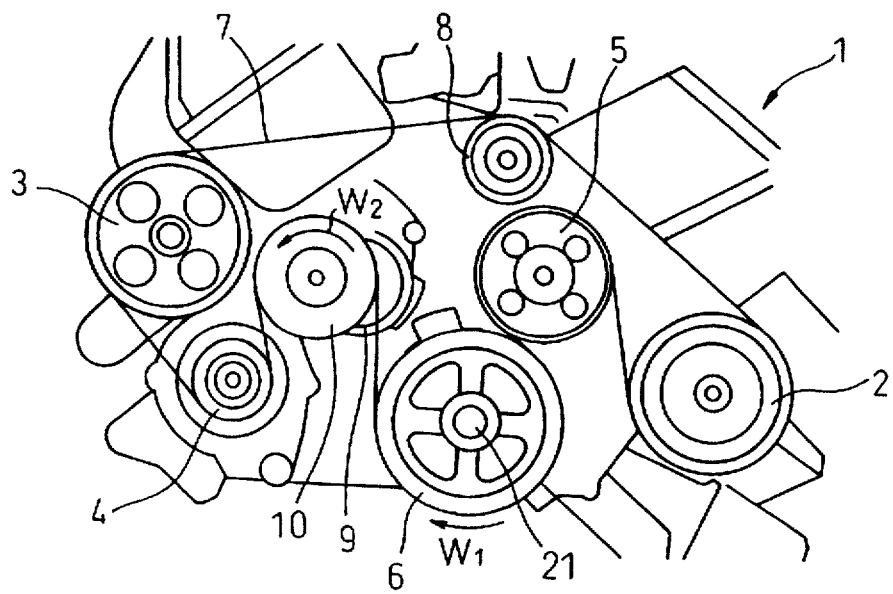
FIG. 1 is a front view of the overall configuration of a mechanism for driving auxiliaries of an automobile.

As shown in FIG. 1, in an engine 1 mounted in an automobile, most of the pulleys used for driving auxiliaries, such as belt pulleys, for example, a pulley 2 for the air-conditioner refrigerant compressor, a pulley 3 for the power-steering oil pump, a pulley 4 for the alternator, that is, the generator, and a pulley 5 for the radiator cooling fan, are simultaneously driven by a pulley 6 (generally known as a "driving shaft pulley") of a crankshaft 21 of the engine, the power source, via a belt 7. Further, there also exists a case where an idler pulley is used for winding a single belt 7 around a number of pulleys in a serpentine manner. In the example of FIG. 1, such an idler pulley 8 is used. In addition, an auto tensioner 9 for automatically adjusting the belt 7 so that the tension of the belt 7 becomes a constant value is provided at the loosest side of the belt 7 along with a single idler pulley 10.

Figure 2:
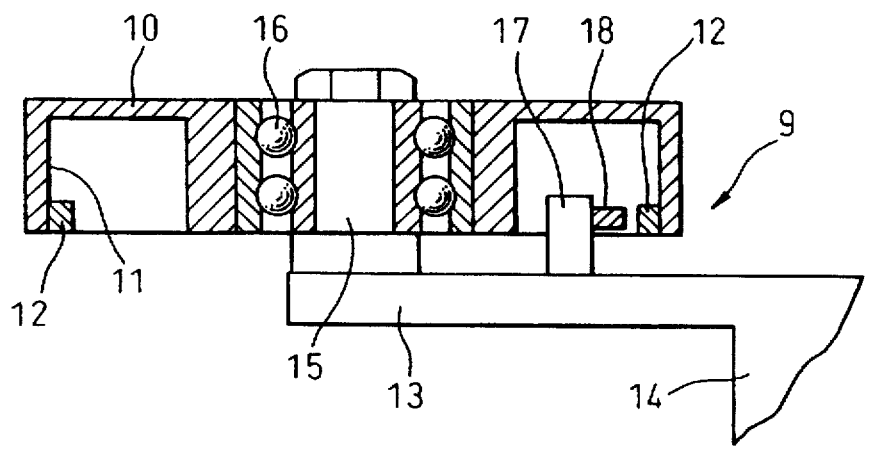
FIG. 2 is a sectional view of a principal part of a first embodiment of an auxiliary torque detection system.
Figure 3:
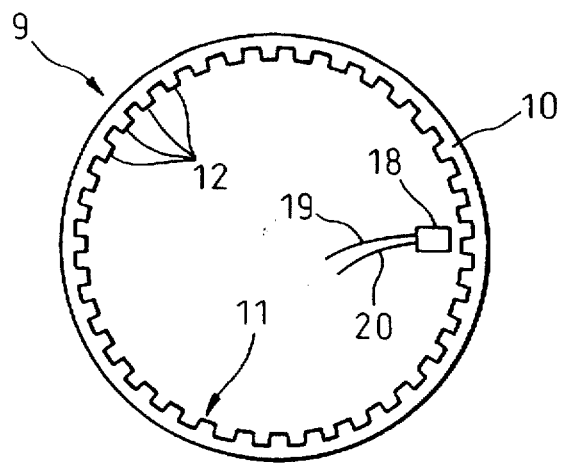
FIG. 3 is a bottom view of an idler pulley shown in FIG. 2.

First, an explanation will be made of a first embodiment of the auxiliary torque detection system utilized for the method of judging the locked state of auxiliaries of an automobile according to the present invention based on the drawings. FIG. 2 and FIG. 3, showing the first embodiment, illustrate the mechanism of an auxiliary torque detection system utilizing the auto tensioner 9. A large number of teeth 12 made of a magnetic material are provided on an annular inner surface 11 of the idler pulley 10 of the auto tensioner 9 at equal intervals. In practice, the entire idler pulley 10 is formed by a magnetic material such as cast iron or steel and the teeth 12 are cut into the annular inner surface 11 to form an inner cogwheel. Alternatively, when the idler pulley 10 is formed by a method such as casting, the teeth 12 at the annular inner surface 11 may be simultaneously formed by the same mold to simplify the manufacturing process.

An arm 13 of the auto tensioner 9 is supported so that the base portion 14 thereof can pivot within a limited angular range by a not illustrated shaft and is biased in a pivoting direction for tensing the belt 7 by a biasing means such as a spring or an oil cylinder, also not illustrated. Further, a bearing 16 is provided on the shaft 15 which is integrally attached to the free end of the arm 13. The idler pulley 10 is rotatably supported by this.

An electromagnetic pick-up 18 is attached as a speed sensor to a projection 17 formed on the arm 13. The front end (detection end) of the electromagnetic pick-up 18 projects out to a position where it can face any of the large number of teeth 12 made of the magnetic material leaving a predetermined clearance. The electromagnetic pick-up 18, as is well known, is formed, explained simply, by winding a coil around a permanent magnet or a core of a magnetic material (one end thereof serving as the detection end) magnetically connected to this, directly connecting the two ends of the coil to external fixed terminals by flexible lead wires 19 and 20 or connecting one end of the coil to the arm 13 and, at the same time, leading out the other end of the coil to the outside by a single flexible lead wire and connecting it to an external fixed terminal. The range of movement (pivoting) of the arm 13 is limited to a narrow angle, so an end of a flexible lead wire can be directly connected to the corresponding fixed terminal to lead the output signal to the outside even without use of a sliding mechanism such as a slip ring as in the related art.

Although not illustrated, a speed sensor for detecting the speed (rotational speed) $W_1$ of the crankshaft is provided on the crankshaft 21 or, even if not the crankshaft 21 itself, a shaft driven by the crankshaft 21 by a constant rotation ratio such as a not illustrated camshaft. In a usual engine, the speed $W_1$ of the engine, or a speed of a shaft rotating with a constant ratio relative to this, must be measured as one of the factors for operational control, so most of the time a speed sensor is provided on the crankshaft etc. Accordingly, the output signal of a speed sensor provided for another purpose can also be utilized for achieving the object of the present invention. Note that, in an engine not provided with a means for detecting the speed $W_1$, it is also possible to provide a means for detection of the speed $W_1$ having a similar configuration to the one shown in for example FIG. 2 and FIG. 3 at the crankshaft pulley 6.

Next, an explanation will be made of the operation of the first embodiment of the present invention shown in FIG. 2 and FIG. 3 by referring to FIG. 1 and FIG. 6. In FIG. 2, the rotation of the crankshaft 21 of the engine 1 drives the rotation of the pulley 2 for the air-conditioner refrigerant compressor, the pulley 3 for the power-steering oil pump, the pulley 4 for the generator, the pulley 5 for the cooling fan, the idler pulley 8, the idler pulley 10 of the auto tensioner 9, etc. which are engaged with the crankshaft pulley 6 via a belt 7. Not only does the torque (auxiliary torque) acting upon the crankshaft 21 for driving these auxiliary pulleys change accompanied with a fluctuation of the speed $W_1$ of the crankshaft 21, but there are also auxiliaries which are intermittently operated like the refrigerant compressor connected to the pulley 2. Therefore the auxiliary torque is never constant and will continuously fluctuate during the operation of the engine 1.

If it were possible for the fluctuating auxiliary torque to be accurately detected constantly in real time, it would be possible to finely control the operating state of the engine 1 as explained above, but in this embodiment, not only is the speed (rotational speed) $W_1$ of the crankshaft 21 detected, but also the speed (rotational speed) $W_2$ of the pulley 10 which is also one of the idler pulleys is detected by the electromagnetic pick-up 18 additionally provided on the auto tensioner 9.

Accordingly, when the idler pulley 10 of the auto tensioner is turned by the drive force transmitted from the crankshaft pulley 6 via the belt 7, the large number of teeth 12 made of the magnetic material intermittently pass the position immediately before the detection end of the electromagnetic pick-up 18, made substantially immovable by being fixed to the arm 13, at very short time intervals. The magnetic flux density of the permanent magnet passing the coil of the electromagnetic pick-up 18 abruptly changes before and after the passage, consequently a pulse current having a voltage waveform with substantially equidistant peaks is generated in the coil of the electromagnetic pick-up 18. This pulse current is directly taken out to an external fixed terminal via the lead wires 19 and 20 etc. as an output signal corresponding to the speed $W_2$ and is input to a not illustrated control unit provided with a processor.

The control unit counts the number of peaks per unit time in the pulse current, that is, the output signal of the electromagnetic pick-up 18, so as to detect the speed (rotational speed) $W_2$ of the idler pulley 10 of the auto tensioner. If the crankshaft pulley 6 and the idler pulley 10 have the same diameter, this speed $W_2$ should be smaller than the speed $W_1$ of the crankshaft pulley 6 by exactly the amount of slip between the crankshaft pulley 6 and the belt 7, therefore the magnitude of the slip of the idler pulley 10 with respect to the crankshaft pulley 6 can be learned from the ratio of the speed $W_1$ and the speed $W_2$, that is, the magnitude of the value of the speed ratio $W_1/W_2$. In this case, since almost no load is generated in the auto tensioner 9, the slip between the belt 7 and the idler pulley 10 can be ignored.

Figure 4:
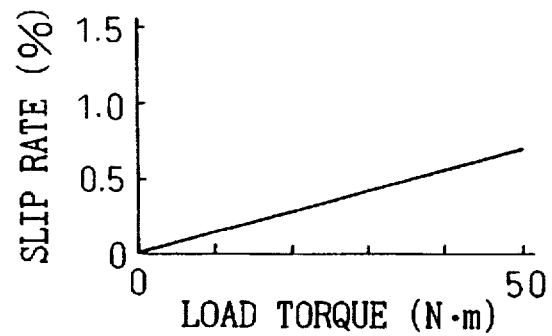
FIG. 4 is a graph of a relationship of a slip ratio and a load torque.

Therefore, by calculating the speed ratio $W_1/W_2$ showing the magnitude of the slip between the crankshaft pulley 6 and the idler pulley 10 from the detected speeds $W_1$ and $W_2$, calculating the slip ratio based on this, and applying this value to a graph such as that shown in FIG. 4, the magnitude of the auxiliary torque acting upon the crankshaft 21 at this point of time can be determined. It has been confirmed by experiments of the inventors that the magnitude of the auxiliary torque can be detected with an extremely high precision by such a method.

In general, the crankshaft pulley 6 and the idler pulley 10 do not have the same diameter, so the situation does not become one as explained above, but in such a case, it is possible to incorporate into the calculations the upward or downward change in speed caused due to the difference of the two pulley diameters so as to determine the amount of slip of the belt 7 and to use this to calculate the magnitude of the auxiliary torque.

Namely, where the symbols $W_1$, $W_2$, S, $R_1$ and $R_2$ are defined as follows:

$W_1$: Rotational speed of the crankshaft 21 and the crankshaft pulley 6;

$W_2$: Rotational speed of the idler pulley 10 of the auto tensioner;

S: Slip ratio of the idler pulley 10 with respect to the crankshaft pulley 6;

$R_1$: Radius of the crankshaft pulley 6; and $R_2$: Radius of the idler pulley 10 of the auto tensioner, the slip ratio S produced between the crankshaft pulley 6 and the belt 7 (idler pulley 10) may be found by the following equation:

$$S = (R_1 \cdot W_1 - R_2 \cdot W_2)/R_2 \cdot W_2$$
$$= (R_1/R_2) \cdot (W_1/W_2) - 1$$

The ratio of radii ($R_1/R_2$) of pulleys in the above equation is constant, therefore the slip ratio S is determined by the value of the ratio ($W_1/W_2$) of the two speeds, which is a variable, in the same way as in the above case where it was assumed the crankshaft pulley 6 and the idler pulley 10 had the same diameter. The graph for finding the value of the auxiliary torque from the slip ratio S found in this way is similar in form to one obtained in FIG. 4 by plotting the slip ratio S is plotted on the ordinate, plotting the load torque (auxiliary torque) on the abscissa, and shifting the slanted line indicating the proportional relationship between the ordinate and abscissa in parallel in the vertical direction.

Therefore, by constantly measuring the speeds $W_1$ and $W_2$ and having calculations as mentioned above automatically performed by a processor in the electronic control unit using the output signals, it becomes possible to continuously detect the magnitude of the auxiliary torque in real time with a high precision and to quickly take the steps required to deal with any potential problems. In this case, needless to say, the auxiliary torque can also be directly calculated omitting the calculation of the slip ratio from the value of $W_1/W_2$.

Next, an explanation will be made of the system for detection of a locked state of auxiliaries of an automobile according to the present invention. This locked state detection system includes, in addition to the above auxiliary torque detection system, a means for engaging or disengaging the clutch of the air-conditioner refrigerant compressor, a control means provided with a processor, and a warning means for when an abnormality such as a locked state occurs in an auxiliary.

When the air-conditioner refrigerant compressor or the power-steering oil pump becomes locked, a clutch disk connecting the refrigerant compressor with the pulley will slip or the belt 7 will slide on the pulley 2 or pulley 3. Experiments have found that the load torque at this time becomes approximately about 60N·m.

Figure 5:
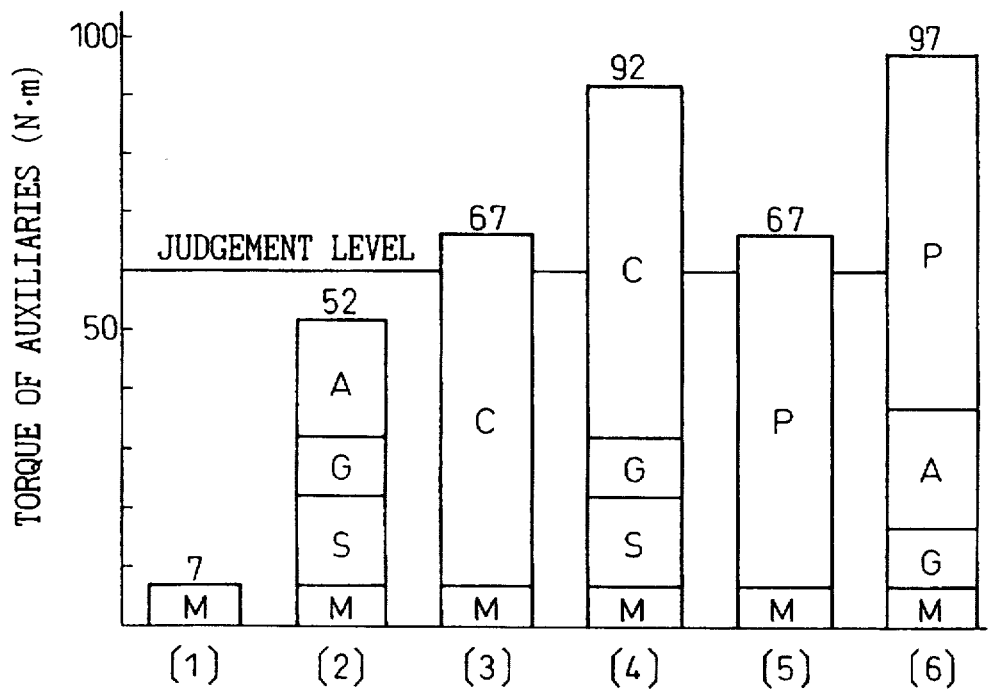
FIG. 5 is a bar graph of the relationship of the auxiliary torque and the load.

FIG. 5 shows the torques for the different auxiliaries and the total torques in various operating states indicated by bracketed numbers. The bracketed numbers indicate the following operating states:

[1]: Minimum load in the normal operating state;

[2]: Maximum load in the normal operating state;

[3]: Minimum load in a state where the air-conditioner refrigerant compressor is locked;

[4]: Maximum load in a state where the air-conditioner refrigerant compressor is locked;

[5]: Minimum load where the power-steering oil pump is locked; and

[6]: Maximum load in a state where the power-steering oil pump is locked.

Further, in FIG. 5, letters are used to indicate the torques in different operating states of the auxiliaries. These, and their torques (unit: N·m), are as follows:

A: Torque in the operating state of the air-conditioner =20

C: Torque in the locked state of the refrigerant compressor=60

P: Torque in the locked state of the power-steering oil pump=60;

S: Torque in the "stationary steering" state (state where the steering wheel is turned while the vehicle is at rest) of the power steering system=15;

G: Torque in the operating state of the alternator when the headlight H/L and defroster D/F are turned on=15; and M: Torques of other auxiliaries=7.

As shown in FIG. 5, in a state where all of the auxiliaries are operating normally, the load torque of the auxiliaries is about 7N·m at the minimum load [1] and about 52N·m at the maximum load [2]. When considering these two extremes, the magnitude of the auxiliary torque is 67N·m at both the minimum load when the refrigerant compressor locks [3] and the minimum load when the oil pump is locks [5], becomes 92N·m at the maximum load when the refrigerant compressor locks [4], and becomes up to 97N·m at the maximum load when the oil pump locks [6]. Note that, in this embodiment, among the auxiliaries of the automobile, those which have a large possibility of locking are the air-conditioner refrigerant compressor and the power-steering oil pump.

Next, an explanation will be made of the operation of the system for detection of a locked state of the auxiliaries of an automobile according to the present invention based on the flowchart of FIG. 6. First, at step 100, the first auxiliary torque X when the compressor of the air-conditioner operates is measured. Then, at step 101, it is judged whether or not the first auxiliary torque X exceeds 60N·m (first predetermined value). Here, when it is judged that the first auxiliary torque X exceeds the first predetermined value, it can be provisionally judged that the air-conditioner refrigerant compressor has become locked, but the following judgement is further carried out to increase reliability.

Namely, when X>60N·m, at step 102, the clutch attached to the air-conditioner refrigerant compressor is disengaged and the pulley 2 and the compressor are separated. Next, at step 103, the second auxiliary torque Y in a state where the compressor of the air-conditioner is not part of the load is measured. At step 104, X and Y are compared and it is judged whether or not the value of X−Y, that is, the amount of decrease of the auxiliary torque due to the disengagement of the clutch, exceeds 30 N·m (second predetermined value). When the value of X−Y exceeds the second predetermined value, it is judged that the refrigerant compressor is in a locked state and, at step 105, an alarm indicating the abnormality of the refrigerant compressor is issued.

In general, when the air-conditioner refrigerant compressor normally operates, the torque caused by the refrigerant compressor is about 20N·m at most, therefore it can be determined that the refrigerant compressor is locked if the torque decreases more than this due to the disengagement of the clutch at step 102. In the locked state of the refrigerant compressor, the clutch disk will slip or the belt 7 will slide with respect to the pulley 2.

On the other hand, when the drop (X−Y) in the auxiliary torque due to the disengagement of the clutch is not found to be less than the second predetermined amount, or 30 N·m, in the judgement of step 104, it can be judged that the air-conditioner refrigerant compressor is not locked and therefore there is another factor involved, that is, the power-steering oil pump is locked. When it is judged that the oil pump is locked in this way, the processing routine proceeds to step 106, at which an alarm indicating the abnormality of the oil pump is issued. In the locked state of the oil pump, the belt 7 slides with respect to the pulley 3.

Figure 6:
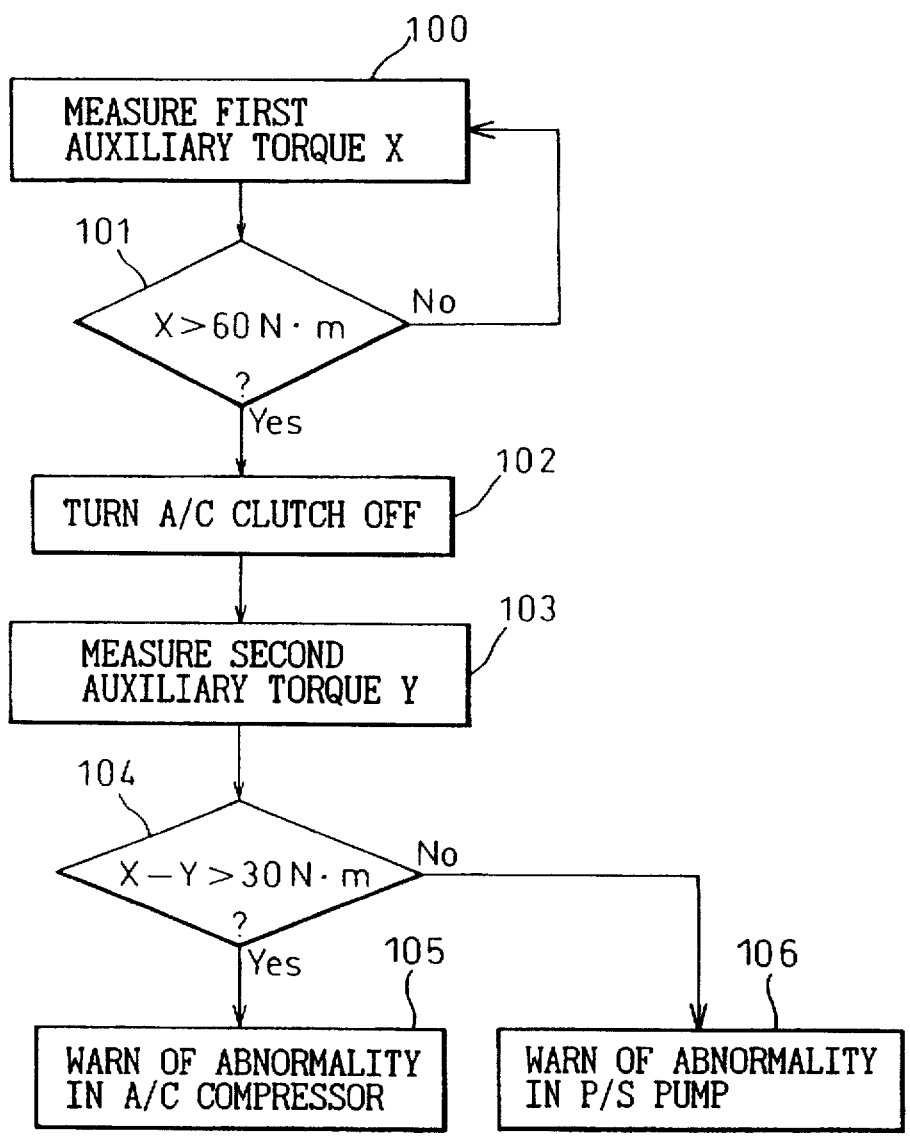
FIG. 6 is a flowchart of an operation of a locked state detection system according to the present invention.
Figure 7:
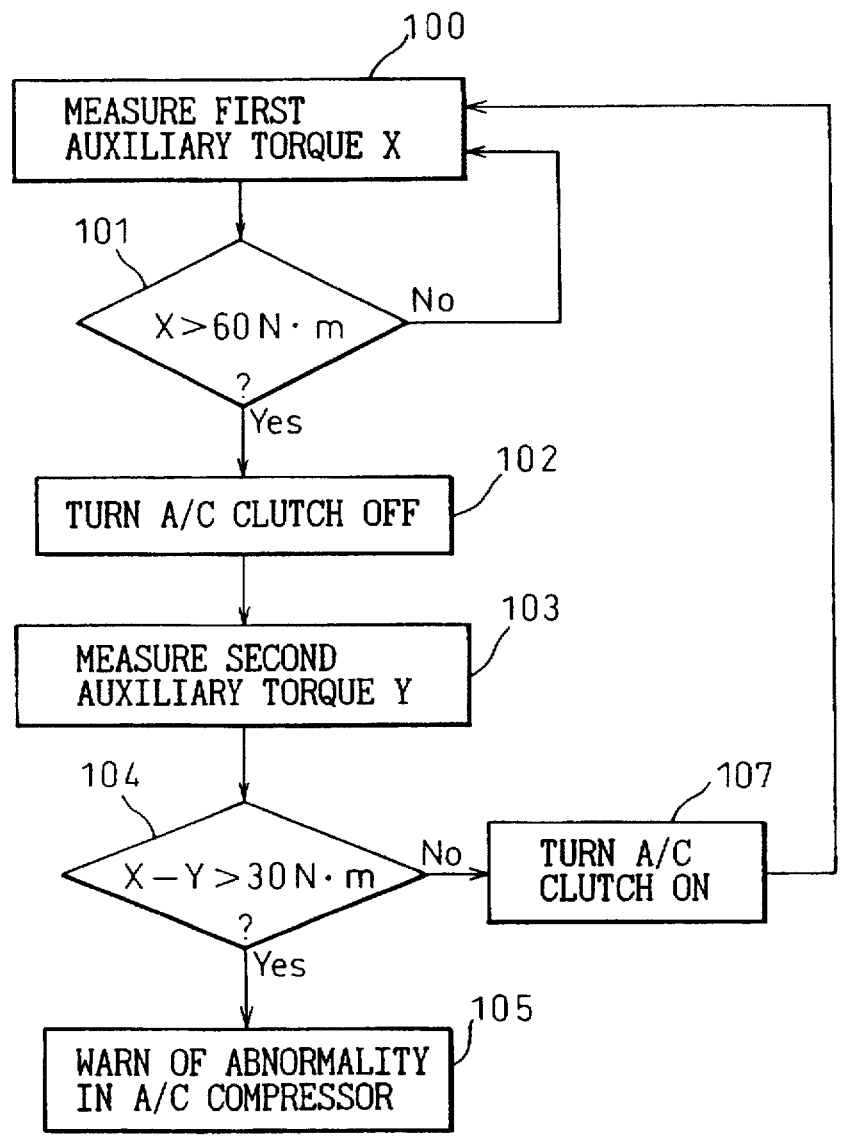
FIG. 7 is a flowchart of the operation of a special example of the locked state detection system according to the present invention.

In an automobile not provided with a power-steering oil pump, in the flowchart shown in FIG. 7, which is similar to that of FIG. 6, when the result of judgement of step 104 is NO, that is, the drop (X−Y) in the auxiliary torque due to the disengagement of the clutch of the air-conditioner refrigerant compressor is not more than the second predetermined value, that is, 30N·m, since there is no other auxiliary which could be locked aside from the refrigerant compressor, it is judged that the engine is in a normal operating state and the processing routine goes to step 107, at which the clutch of the refrigerant compressor is reengaged. The processing routine then returns to the first step 100 and the above operations are repeated. Note that, the flowchart shown in FIG. 7 is the same in content as the flowchart shown in FIG. 6 except for step 107, therefore explanations of overlapped portions are omitted.

In a system for detection of a locked state of auxiliaries of an automobile whose operation is shown in the flowchart of FIG. 6 or FIG. 7, it is judged whether one of the air-conditioner refrigerant compressor or the power-steering oil pump is locked by comparing the value of the difference between the first auxiliary torque X and the second auxiliary torque Y with a second predetermined value, but as an easier method, it is also possible to store the normal value of the first auxiliary torque measured in a state where all of the auxiliaries are operating normally in a memory etc. of the control unit and compare this value and the actually measured second auxiliary torque Y to judge the locked state.

According to this method, if the second auxiliary torque Y measured in a state where the clutch of the air-conditioner refrigerant compressor is disengaged is smaller than the normal value of the first auxiliary torque, it can be judged that the refrigerant compressor connected by the clutch has locked. Contrary to this, where the second auxiliary torque Y is larger than the normal value of the first auxiliary torque, it can be deduced that something other than the refrigerant compressor connected by the clutch, that is, the lockable power-steering oil pump, has locked.

Next, an explanation will be made of a second embodiment of an auxiliary torque detection system utilized for the method of judging a locked state of auxiliaries of an automobile of the present invention referring to the drawings.

Figure 8:
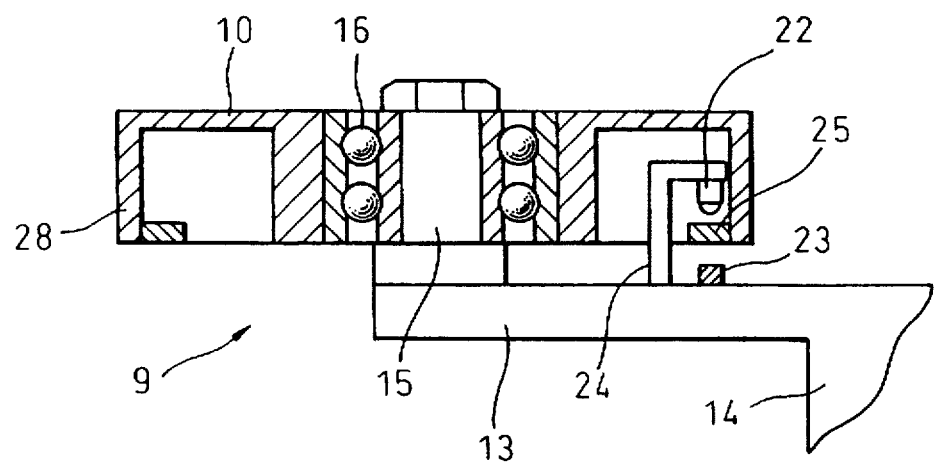
FIG. 8 is a sectional view of a principal part of a second embodiment of the auxiliary torque detection system.
Figure 9:
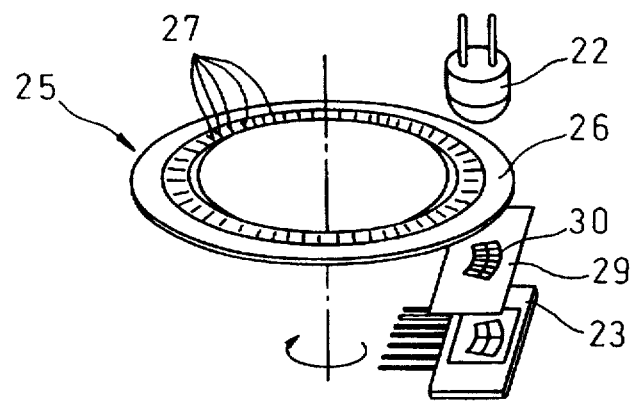
FIG. 9 is a conceptual perspective view of a principal part of the speed sensor shown in FIG. 8.

In the first embodiment, an electromagnetic induction type pick-up 18 was used as the speed sensor. Here, however, an explanation will be made, as a second embodiment, of one using light for the speed sensor. In FIG. 8 and FIG. 9, reference numeral 22 denotes a light emitting element such as a light emitting diode, and 23 denotes a light receiving element such as a photodiode. The light emitting element 22 and the light receiving element 23 are attached on the arm 13 so as to face each other at the edge of the idler pulley 10 of an auto tensioner 9 similar to that in for example the first embodiment. For this purpose, it is also possible to integrally form with the arm 13 a projection 24 supporting one of the light emitting element 22 or the light receiving element 23.

The light emitting element 22 and the light receiving element 23 are positioned so that a rotation slit 25 formed in an annular shape at the edge portion of the idler pulley 10 is interposed between the light emitting element 22 and the light receiving element 23. The rotation slit 25, as apparent from FIG. 9, has fine radial openings 27 formed at equal intervals in its circumferential direction for allowing light to pass through the annular plate 26. It is possible to form these openings directly in the skirt portion 28 of the idler pulley 10 or to form the rotation slit 25 as a separate piece from the idler pulley 10 and attach this to the skirt portion 28. Further, a rectangularly shaped fixed slit 29 is affixed as a mask on the light receiving surface of the light receiving element 23. Several openings 30 are formed in the fixed slit 29.

The second embodiment of the auxiliary torque detection system utilized for the method of the present invention being configured in this way, when the idler pulley 10 of the auto tensioner is driven by the belt 7 and rotates, the rotation slit 25 rotates too. When the light axis of the light emitting element 22 matches with an opening 27 formed in the annular plate 26 of the rotation slit 25 and an opening 30 formed in the fixed slit 29, the light emitted from the light emitting element 22 reaches the light receiving element 23 and a pulse current is output from the light receiving element 23. Accordingly, this represents the speed $W_2$ of the idler pulley 10 in the same way as the output signal of the electromagnetic pick-up 18 in the first embodiment. It is possible to process this together with the separately measured speed $W_1$ of the crankshaft 21, calculate the slip ratio S of the idler pulley 10 with respect to the crankshaft pulley 6, and determine the auxiliary torque acting upon the crankshaft 21 from the graph of FIG. 4.

In the second embodiment, further, since both of the light emitting element 22 and the light receiving element 23 are attached on the arm 13, which can move only within a small range of rotation, it is possible to direct connect the flexible lead wires leading from the terminal 31 of the light emitting element 22 and the terminal 32 of the light receiving element 23 to the corresponding outside terminals without passing them through a sliding part such as a slip ring, so there is no fear of a loss of reliability or durability due to the use of a slip ring.

In the above explanations, mention was made of an example of provision of the electromagnetic pick-up 18 or an optical sensor in place of this at the idler pulley 10 of the auto tensioner 9 for use as a speed sensor for detecting the speed $W_2$ including the slip, but in the present invention the provision of these speed sensors at the auto tensioner 9 is not an essential requirement. It is also possible to provide a speed sensor at another pulley where no substantial load acts such as the idler pulley 8 provided as the guide of the belt 7. Further, it goes without saying that the source of the force for driving the rotation in the vehicle is not limited to the engine.

Figure 10A:
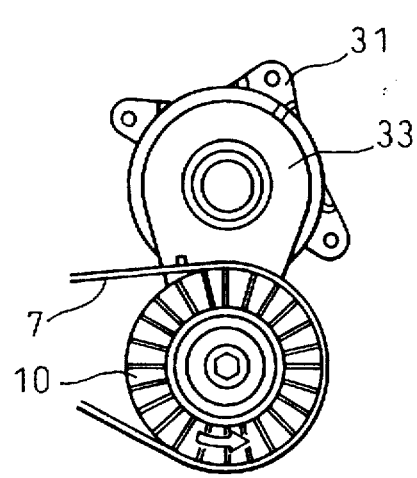
FIG. 10A is a front view of a third embodiment of the auxiliary torque detection system.

Next, an explanation will be made of a third embodiment of the auxiliary torque detection system utilized for the method of judging locking of auxiliaries of an automobile of the present invention based on the drawings. The configuration of the third embodiment is shown in FIG. 10A to FIG.

Figure 10B:
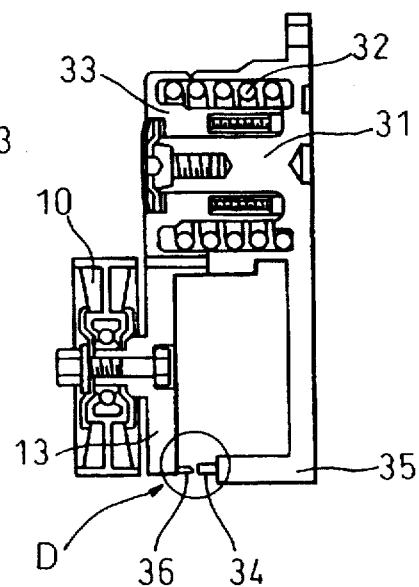
FIG. 10B is a side sectional view thereof.
Figure 10C:
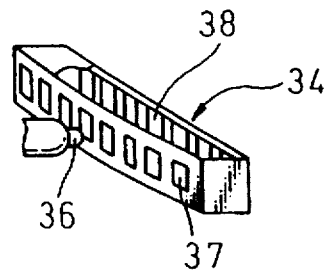
FIG. 10C is an enlarged perspective view of a part D in FIG. 10B.

10C. FIG. 10A is a front view of the auxiliary torque detection system; FIG. 10B is a side sectional view; and FIG. 10C is an enlarged perspective view of the part D in FIG. 10B.

The auto tensioner comprises a fixed housing 31, a coil spring 32 serving as an elastic member, a moveable housing 33, an arm 13, which is part of the moveable housing 33, and an idler pulley 10. The moveable housing 33 and the fixed housing 31 are connected by the coil spring 32. The moveable housing 33 moves along with the tension of the belt 7. A displacement sensor of the light receiving portion (photodiode array) 34 is disposed on a stay 35 affixed to a fixed housing 31 and forming part of the fixed housing 31. The light emitting portion (light emitting diode) 36 facing this is disposed on the arm 13 which forms part of the moveable housing 33.

Next, an explanation will be made of the operation of the auxiliary torque detection system of the third embodiment. The moveable housing 33, that is, the moving portion of the auto tensioner, rotates against the biasing force of the coil spring 32 in accordance with the load torque of the auxiliaries. This causes displacement of the light emitting portion 36 attached onto the arm 13 forming part of the moveable housing 33. The light from this light emitting portion passes through the slit 37 of the light receiving portion 34 to reach the light receiving element 38. The amount of displacement of the auto tensioner can be learned from the detected position of the light receiving portion 34 (photodiode array) to enable detection of the load torque of the auxiliary.

Figure 11:
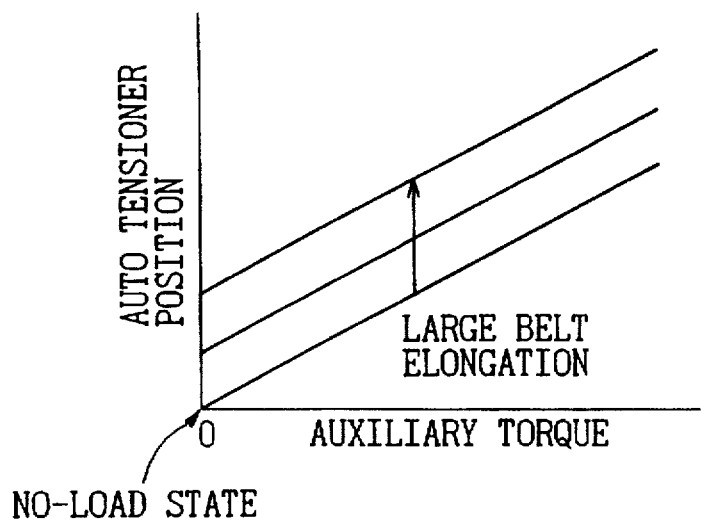
FIG. 11 is a graph of a relationship of a position of an auto tensioner and auxiliary torque where a belt has deteriorated and stretched.

Note that the relationship between the position of the auto tensioner and the auxiliary torque when the belt has deteriorated and has stretched becomes as shown in FIG. 11. The only effect is that the position under the no-load state is changed along with the amount of stretching of the belt. To deal with this, it is enough to make the relative position between the displacement sensor of the light receiving portion (photodiode array) 34 and the light emitting portion (light emitting diode) 36 facing it the same as that before the belt stretched so that the amount of deviation is corrected in the no-load state before the start of the engine.

Further, to deal with the fluctuation in the position of the auto tensioner due to the vibration of vehicle, engine, etc., it is possible to perform electrical filtering by a 1 Hz or so low pass filter to remove the AC component.

Figure 12A:
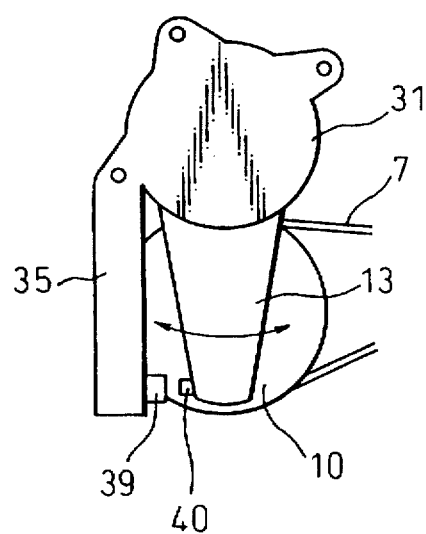
FIG. 12A is a front view of a fourth embodiment of the auxiliary torque detection system.
Figure 12B:
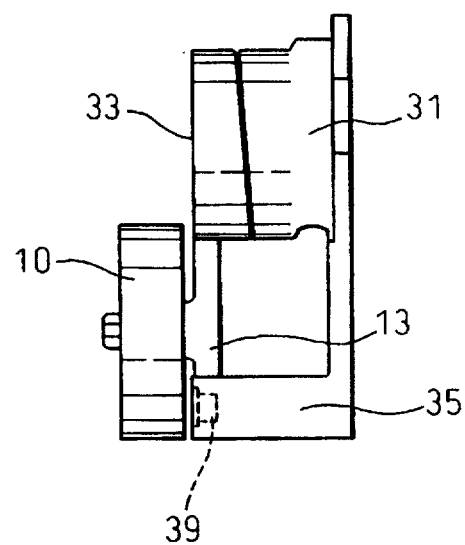
FIG. 12B is a side view thereof.

Next, a fourth embodiment of the detection system for detecting the auxiliary torque is shown in FIG. 12A and FIG. 12B. FIG. 12A is a front view of the auxiliary torque detection system; and FIG. 12B is a side view. In the figures, the same reference numerals are assigned to the parts the same as those of the third embodiment and overlapping explanations are omitted. In this case, the auxiliary torque is detected by the displacement between one part 39 and another part 40 facing each other.

When using an ultrasonic wave type displacement sensor as the part 39, any solid material can be used for the other part 40, but preferably use is made of a metal, ceramic, plastic, or the like.

When using an eddy current type displacement sensor as the part 39, preferably a metal is used for the part 40 as it allows the current to pass through it.

Further, when using an optical (triangular distance type) sensor as the part 39, any opaque solid can be used as the part 40, but preferably use is made of a metal, opaque ceramic, plastic, or the like.

Finally, an explanation will be made of a fifth embodiment of the auxiliary torque detection system utilized for the method of judging the locking of auxiliaries of an automobile of the present invention. In both of the first embodiment and second embodiment, the auxiliary torque was calculated from the ratio of speed ($W_1/W_2$) of the speed $W_1$ of the crankshaft 21 shown in FIG. 1 and the speed $W_2$ of the idler pulley 10 of the auto tensioner 9. In the fifth embodiment as well, the speed of the crankshaft 21 shown in FIG. 1 is still used as the speed $W_1$, but, as the speed $W_2$, rather than use the rotational speed of the idler pulley 10, the speed of the pulley 4 for the alternator, that is, the AC current generator, provided at a position next weakest in belt tension after the idler pulley 10 in the group of the pulleys engaged with the same belt 7 is detected and utilized.

In this case as well, the ratio ($W_1/W_2$) of the two speeds corresponds to the slip ratio and can be used to determine the magnitude of the auxiliary torque in the same way as the embodiments mentioned above. In addition, since the speed $W_2$ is the speed of the alternator, the speed $W_2$ can be immediately determined by measuring the frequency of the AC voltage output from the alternator, so there is the advantage that the means for detecting the speed $W_2$ becomes further simpler than the case of the other embodiments. Similar effects to those of the other embodiments are exhibited in addition to this.

Further, while the above embodiments were explained with reference to a power-steering oil pump as the lockable auxiliary other than the refrigerant compressor, there are other accessories which might lock as well such as the water pump used for cooling the engine. The present invention is therefore not limited to only the locked state of the air-conditioner refrigerant compressor and the power-steering oil pump.

We claim:

1. A method for judging a locked state of auxiliaries of an automobile in a belt driving system having a drive shaft pulley provided in an engine and rotated by said engine and having auxiliary pulleys driven simultaneously by a single belt wound upon said drive shaft pulley corresponding to a plurality of auxiliaries including at least an air-conditioner refrigerant compressor, comprising:

measuring a first auxiliary torque when the air-conditioner is operating by an auxiliary torque detection system, disengaging a clutch of said air-conditioner refrigerant compressor when said first auxiliary torque exceeds a first predetermined value, measuring a second auxiliary torque in a state where the clutch of said refrigerant compressor is disengaged, comparing said first auxiliary torque and said second auxiliary torque, and judging that said refrigerant compressor is in a locked state when a difference between them exceeds a second predetermined value.

2. A method for judging a locked state of auxiliaries for an automobile according to claim 1, wherein when the comparison of said first auxiliary torque and said second auxiliary torque shows that the difference between them does not exceed said second predetermined value, it is judged that an auxiliary other than said refrigerant compressor is in a locked state.

3. A method for judging a locked state of auxiliaries of an automobile in a belt driving system having a drive shaft pulley provided in an engine and rotated by said engine and having auxiliary pulleys driven simultaneously by a single belt wound upon said drive shaft pulley corresponding to a plurality of auxiliaries including at least an air-conditioner refrigerant compressor, comprising:

measuring a first auxiliary torque when the air-conditioner is operating by an auxiliary torque detection system, storing in advance a normal value of said first auxiliary torque when all of the auxiliaries are operating normally, disengaging a clutch of said air-conditioner refrigerant compressor when said first auxiliary torque exceeds the first predetermined value, measuring a second auxiliary torque in a state where the clutch of said refrigerant compressor is disengaged, comparing the normal value of said first auxiliary torque and said second auxiliary torque, and judging that said refrigerant compressor is in a locked state when said second auxiliary torque is lower than the normal value of said first auxiliary torque.

4. A method for judging a locked state of auxiliaries of an automobile according to claim 3, wherein when the comparison of the normal value of said first auxiliary torque and said second auxiliary torque shows that said second auxiliary torque is higher than the normal value of said first auxiliary torque, it is judged that an auxiliary other than said refrigerant compressor is in a locked state.

* * * * *